United States Patent [19]

Fujii

[11] 4,377,299

[45] Mar. 22, 1983

[54] AUTOLEVELING DEVICE FOR A VEHICLE WITH A HYDRO-PNEUMATIC SUSPENSION

[75] Inventor: Masayuki Fujii, Yokohama, Japan

[73] Assignee: Nissan Motor Co., Ltd., Yokohama, Japan

[21] Appl. No.: 94,573

[22] Filed: Nov. 15, 1979

[30] Foreign Application Priority Data

Nov. 20, 1978 [JP] Japan .......................... 53-142189[U]

[51] Int. Cl.³ ............................................. B60G 11/26
[52] U.S. Cl. .................................. 280/708; 267/64.28; 280/714
[58] Field of Search ............... 280/713, 714, 708, 6 R, 280/6 H, 6.1, 6.11; 267/65 D

[56] References Cited

U.S. PATENT DOCUMENTS 3,659,870  5/1972  Okuyama ............................ 280/713
3,831,968  8/1974  Shaffer ................................ 280/714

Primary Examiner—Joseph F. Peters, Jr.
Assistant Examiner—John A. Carroll
Attorney, Agent, or Firm—Thompson, Birch, Gauthier & Samuels

[57] ABSTRACT

An autoleveling device for a vehicle having hydro-pneumatic suspension units including a housing fixed to a vehicle body the housing having an oil supply port, an oil exhaust port and a cylinder port commonly connected to the hydro-pneumatic suspension units, a cam rotatable in response to variations in vehicle height, a first piston movably following the profile of the cam, a second piston in opposition to the first piston, a first spring interposed between the first and second pistons, a second spring interposed between the second piston and an end of the housing to balancingly support the second piston with the first spring, an oil supply valve adapted to be opened by a displacement of the second piston in excess of a determined value in one direction to communicate the cylinder port with the oil supply port, an oil exhaust valve opened by a displacement of the second piston in excess of a determined value in the other direction to communicate the cylinder port with the oil exhaust port, a first oil chamber enclosing the first spring and second oil chamber enclosing the second spring on both sides of the second piston being communicated with each other through an orifice, thereby performing the autoleveling function with high accuracies by selecting the cam profile for moving the first piston, but preventing the autoleveling function when wheels of the vehicle momentarily hop due to unevenness of roads owing to a time delay constant resulting from the flow resistance of oil flowing through the orifice.

6 Claims, 5 Drawing Figures

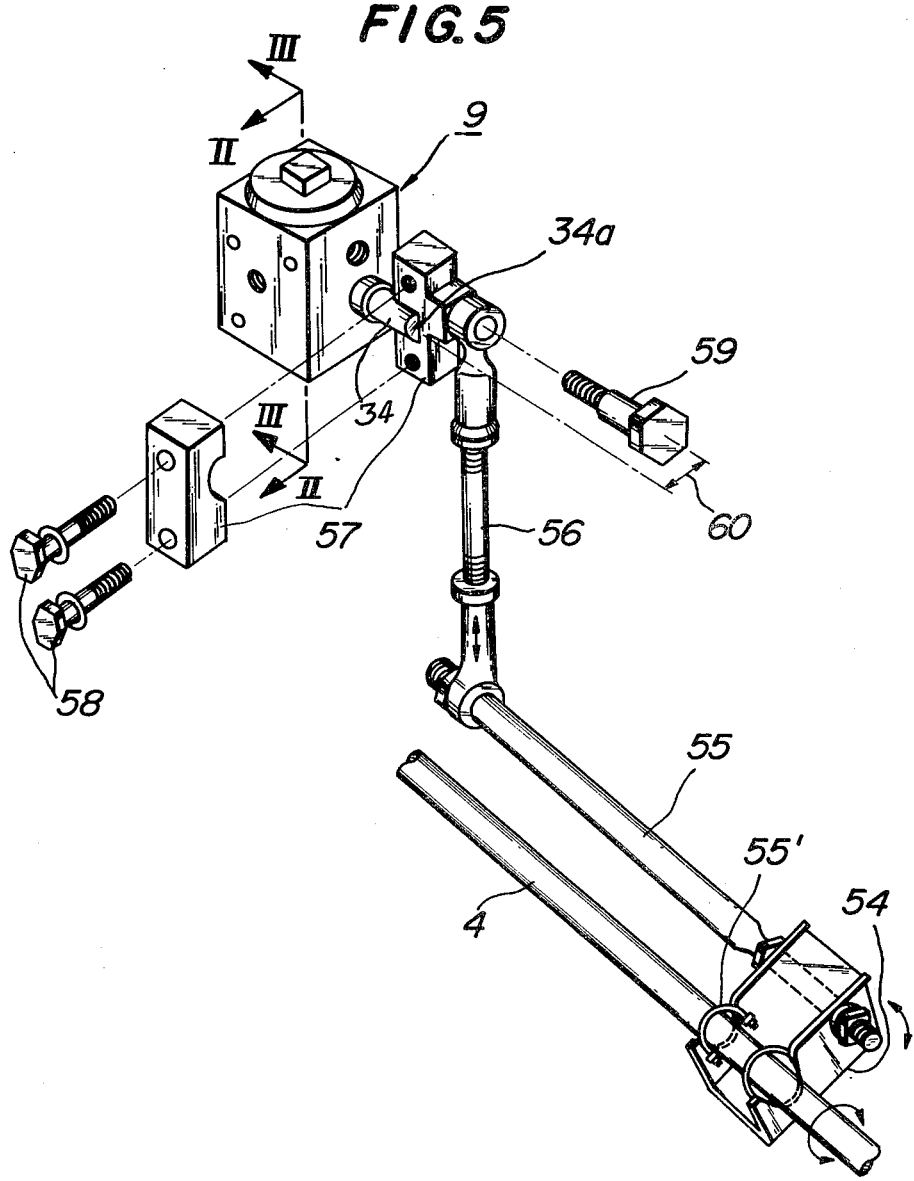

AUTOLEVELING DEVICE FOR A VEHICLE WITH A HYDRO-PNEUMATIC SUSPENSION

BACKGROUND OF THE INVENTION

1. Field of the Invention

The present invention relates to an autoleveling device for a vehicle with a hydro-pneumatic suspension using hydro-pneumatic suspension units for suspending respective wheels.

2. Description of the Prior Art

Such a kind of suspension has been practically used for some vehicles because it is able to keep a vehicle height at a determined level even when a load acting upon the vehicle varies as due to variations in number of passengers. In such autoleveling devices for maintaining the vehicle height, there has been known a built-in type wherein an autoleveling device is built into each suspension unit which is provided between each suspension member and the vehicle body, and also an outlying type wherein an autoleveling device is arranged on a vehicle body at an intermediate location between right and left wheels so as to operate in response to vertical displacements (variations in vehicle height) of axle tubes or rotating movements of an antiroll bar connecting suspension members.

The outlying type autoleveling device makes possible the use of small and simple suspension units in comparison with the units required with the built-in type autoleveling device and has an advantage in that the device is not affected by rolling of the vehicle when turning because the device operates at the mid portion of the vehicle in response to averaged displacements of the suspension members for the right and left wheels. The present invention relates to an improvement of the outlying type autoleveling device.

In general, a conventional autoleveling device actuates oil supply and exhaust valves by control members in response to variations in vehicle height for suplying and exhausting the oil from the suspension units, thereby maintaining the vehicle height. The variations in vehicle height are detected by variations in distance between the suspension member and vehicle body (e.g. detecting rotative positions of the antiroll bar). The and the distance between the suspension member and vehicle body varies greatly not only in response to load, but also in response to wheel hop (i.e. rapid up and down wheel movement) caused by unevenness of the roads. Because operative movements of the control members in response to the variations in the distance sometimes become quite large, they can require the size of a conventional autoleveling device to become too large to be put to practical use. Consequently, springs acting upon ends of the control members are generally used to balancingly support the control members. When the variation in the distance occurs, one of the springs is subjected at its end to the displacement so as to cause a variation in the balancing support of the control members, thereby enabling the control members to be proportionally responsive to the variations in the distance to limit the operative movements to a controllable range.

In such conventional devices, however, as the displacement of the suspension member is transmitted in a proportionally reduced amount to the control member, the operative movement of the control member is much smaller relative to the displacement of the suspension member, so that the displacement of the control member is prone to error resulting in incorrect autoleveling function.

Moreover, as the control members respond linearly to the variation in vehicle height, it is impossible to increase the displacement of the control members corresponding to the variation in vehicle height in the proximity of the standard height in order to improve the responsiveness of the control members to obtain the precise autoleveling function. In other words, if the displacement of the control members is increased, the operative movements of the control members become larger as a whole which would exceed the controllable range and make the autoleveling device too long to be put to practical use.

SUMMARY OF THE INVENTION

It is an object of the invention to provide an improved autoleveling device for a vehicle, which eliminates all of the disadvantages of the prior art.

It is another object of the invention to provide an autoleveling device for a vehicle which performs the autoleveling function with high accuracy by means of cam means which actuates control members after converting variations in vehicle height into rotative displacements and is capable of freely selecting the displacement of the control members in response to the variations in vehicle height according to a determination of its cam profile without changing the operative range of the control members as a whole.

According to the invention, the cam profile is so selected that the displacements of the control members in response to the variation in the vehicle height are large in the ranges immediately above and below the standard vehicle height and the displacements are small or preferably zero in the ranges other than the above range. This profile is selected because after the autoleveling function has been started by opening any one of the oil supply and exhaust valves no further diplacement of the control member is any longer needed.

It is further object of the invention to provide an autoleveling device for a vehicle which keeps the vehicle at a standard height but does not perform the autoleveling function when the wheels of the vehicle momentarily hop due to unevenness of roads.

In order that the invention may be more clearly understood, preferred embodiments will be described, by way of example, with reference to the accompanying drawings:

BRIEF DESCRIPTION OF THE DRAWINGS

FIG. 5 is a perspective view illustrating means for connecting the autoleveling unit shown in FIG. 2 to an antiroll bar.

DETAILED DESCRIPTION OF THE PREFERRED EMBODIMENT

Figure 1:
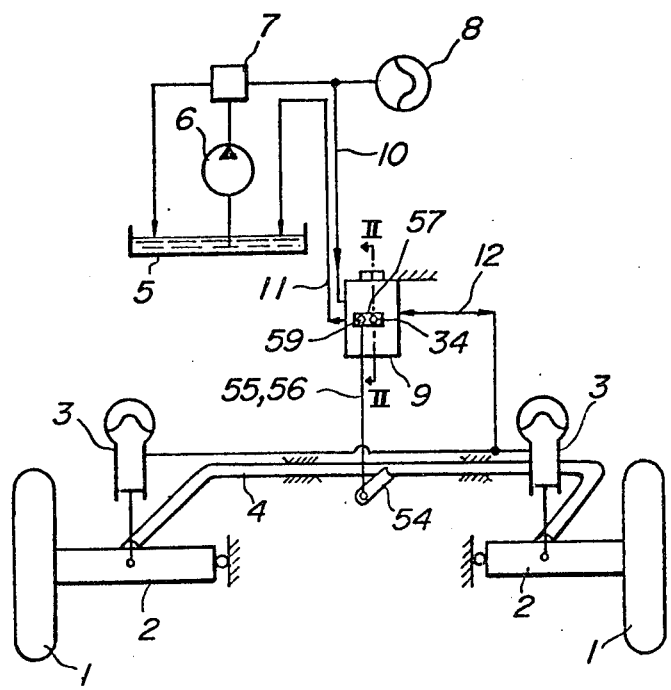
FIG. 1 is a diagrammatical view illustrating a hydraulic suspension system for a vehicle including an autoleveling device according to the invention.

Referring to FIG. 1 illustrating a hydraulic suspension system for a vehicle including an autoleveling device according to the invention, the drawing includes two front or rear wheels 1 for the vehicle, suspension members 2, hydro-pneumatic suspension units 3 each interposed between a suspension member 2 and the vehicle body, and an antiroll bar 4 connecting the suspension members 2. The system includes a reservoir 5, a pump 6 for pumping oil in the reservoir 5, an unloading valve 7 and an accumulator 8 for accumulating a constant oil pressure under the action of the unloading valve 7 by means of the pump 6, these components forming a hydraulic pressure source for this hydropneumatic suspension. The autoleveling device 9 according to the invention comprises a piping 10 from the accumulator 8, a drain pipe 11 and a piping 12 from the suspension units 3.

Figure 2:
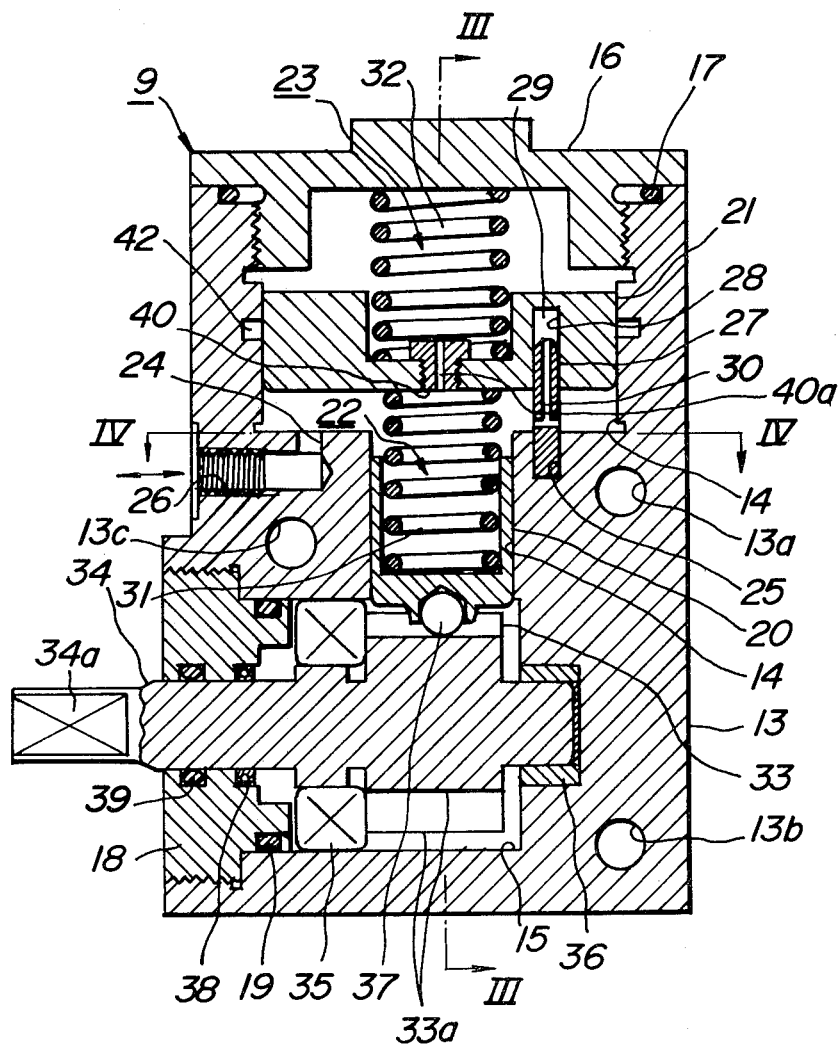
FIG. 2 is a longitudinal sectional view taken along the line II—II in FIGS. 1 and 5 of one embodiment of the autoleveling device according to the invention.
Figure 3:
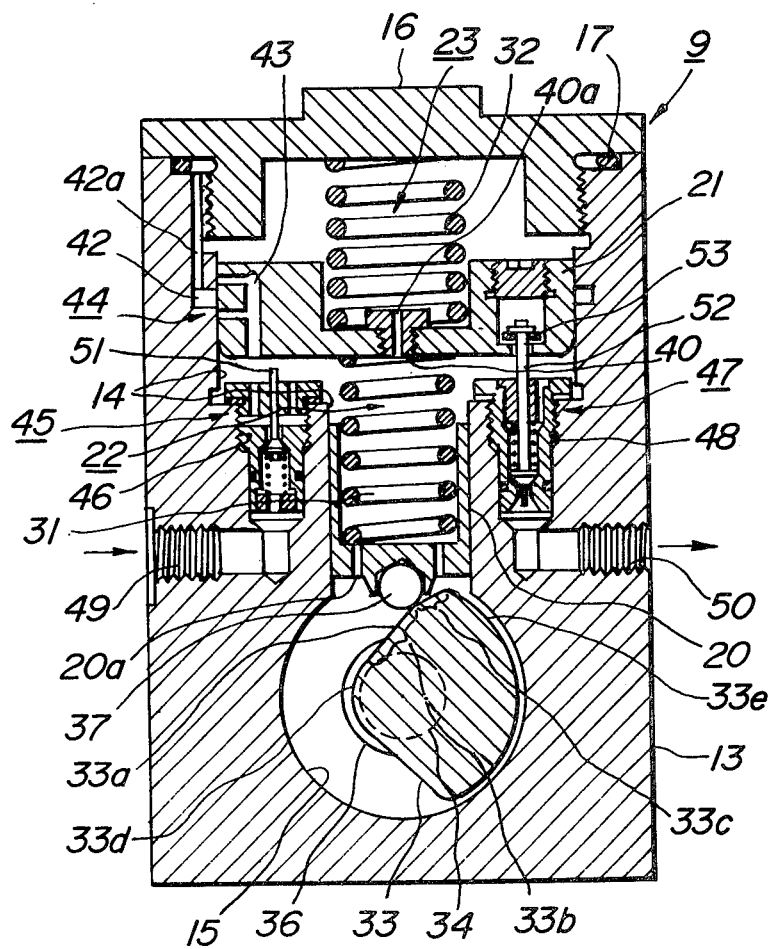
FIG. 3 is a longitudinal sectional view taken along the line III—III in FIGS. 2 and 5.
Figure 4:
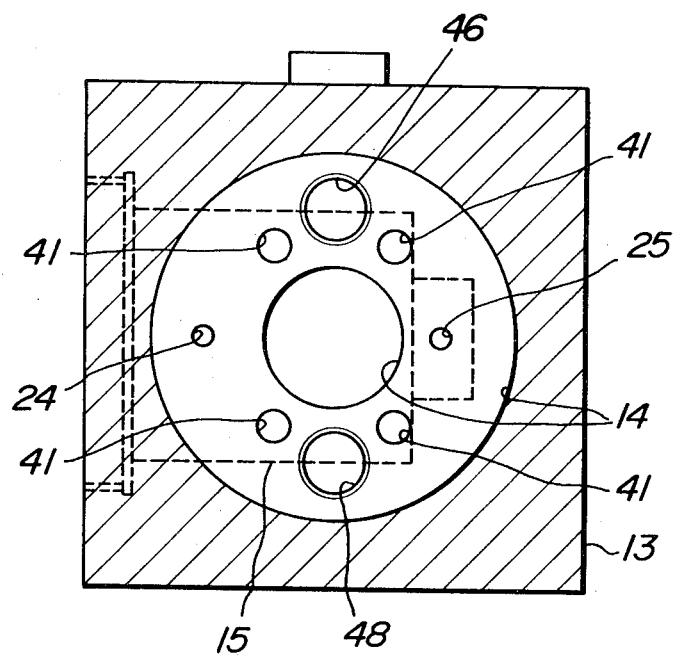
FIG. 4 is a cross-sectional view taken along the line IV—IV in FIG. 2 illustrating the housing of the device.

One embodiment of the autoleveling device 9 according to the invention is shown in FIGS. 2-4. A housing 13 includes a stepped cylinder bore 14 and a cam chamber 15 whose axes are perpendicular to each other. The stepped cylinder bore 14 has an open end which is closed by a head plug 16 with the aid of an oil seal 17 in a liquid-tight manner. The cam chamber 15 has an open end which is also closed by a shaft cover 18 screwed into the housing with an oil seal 19 in a liquid-tight manner. The housing 13 is formed with apertures 13a, 13b and 13c and is bolted to a vehicle body by means of bolts (not shown) passing through the apertures 13a, 13b and 13c.

Within a reduced diameter bore and a large diameter bore of the stepped cylinder bore 14 are slidably fitted a first piston 20 and second piston 21, respectively, to define a first oil chamber 22 between these pistons and a second oil chamber 23 between the second piston 21 and head plug 16. The housing is formed with a communication port 24 opening at a shoulder of the stepped cylinder bore 14 for communicating the first oil chamber 22 with a cylinder port 26 formed in the housing. The housing is further formed with a blind hole 25 which does not pass through the housing but has a bottom for fitting therein a guide pin 27 whose one end slidably extends in a blind hole 28 of the second piston 21 to prevent it from rotating about its axis. The guide pin 27 is formed with an oil passage 30 communicating a chamber 29 in the blind hole 28 with the first oil chamber 22 for preventing the second piston 21 from being locked due to trapped oil in the chamber 29. A first spring 31 is arranged between the first and second pistons 20 and 21 and a second spring 32 is arranged between the second piston 21 and head plug 16 under compressed conditions to support the second piston 21 in a balanced manner between the springs 31 and 32.

Within the cam chamber 51 is received a cam 33 integrally formed with a cam shaft 34 rotatably supported by bearings 35 and 36 in the housing 13 such that cam surfaces 33a–e of the cam 33 contact the lower surface of the first piston 20. A ball 37 is fitted in the lower surface of the first piston 20. Ball 37 rolls on the cam surfaces 33a–e to move the first piston 20 in accordance with the cam profile of the cam 33 during cam rotation. The cam shaft 34 includes one end extending through the shaft cover 18 which end is formed with a flat surface 34a. A rotating seal 38 and an O-ring 39 create a seal between the shaft cover 18 and cam shaft 34 in a liquid-tight manner.

The first oil chamber 22 is communicated with the second oil chamber 23 through an orifice 40a of a plug 40 provided in the second piston 21 and with the cam chamber 15 through-apertures 20a provided in the first piston 20 (FIG. 3) and oil apertures 41 formed in the housing 13 (FIG. 4), thereby normally equalizing the pressures in the chambers 22 and 15 on both sides of the first piston 20 and lubricating the cam surfaces of the cam 33 with the oil in the chamber 15. The first and second oil chambers 22 and 23 are further communicated depending upon the displacement of the second piston 21 through channels explained hereinafter. As shown in FIG. 3, the inner circumferential wall of the stepped cylinder bore 14 on which the second piston 21 slidably moves is formed with a groove 42 communicating with the second oil chamber 23 through a longitudinal channel 42a formed in the housing 13. The second piston 21 is formed with oil passages 43 opening at two points in the circumferential surface of the second piston 21 spaced apart determined distances from the groove 42 on both sides thereof when the second piston 21 is in the position shown in the drawings and communicating with the first oil chamber 22. With this arrangement, as the second piston 21 is vertically moved a determined distance from the position shown in the drawings, the oil passages 43 communicate with the groove 42 to form an open and close valve 44 for communicating the first and second oil chambers 22 and 23.

The housing 13 is further formed with holes 46 and 48 opening at the shoulder of the stepped cylinder bore 14 for threadedly receiving therein an oil supply valve 45 and and oil exhaust valve 47, respectively, and formed with an oil supply port 49 and an oil exhaust port 50 communicating with the holes 46 and 48, respectively. The oil supply and exhaust valves 45 and 47 are conventional normally closed poppet valves. The oil supply and exhaust valves 45 and 47 are so arranged that a valve stem 51 of the oil supply valve 45 is spaced a determined distance from and in opposition to the lower surface of the second piston 21 in the position shown in FIG. 3 and a valve stem 52 of the oil exhaust valve 47 is adapted to engage the second piston through a ring 53 anchored to the valve stem 52 during the raising movement of the second piston 21 more than a determined distance from the position shown in FIG. 3.

FIG. 5 illustrates means for connecting the autoleveling unit 9 to the antiroll bar 4 embodied according to the invention. With this embodiment, a lever 54 is connected to the mid portion of the antiroll bar 4 by means of U-shaped bolts 55' so as to extend radially outwardly of the antiroll bar 4. The free end of the lever 54 is connected to one end of a connecting rod 55. The other end of connecting rod 55 is pivotally connected to a lower end of a vertical rod 56. On the other hand, to the flat surface 34a of cam shaft 34 are connected connecting blocks 57 by means of set screws 58 in an unrotatable manner. An upper end of the vertical rod 56 is pivotally connected to the connecting block 57 by means of a pivot pin 59. Axes of the cam shaft 34 and pivot pin 50 are offset as shown at 60. The rotating displacement of the mid portion of the antiroll bar 4 due to a variation in height of the vehicle causes the vertical rod 56 to move vertically through the lever 54 and connecting rod 55. The vertical movement of the vertical rod 56 causes in turn the cam shaft 34 to be rotated through the connecting blocks 34 owing to the offset 60, so that the cam 33 integrally formed with the cam shaft 34 is rotated in response to the variation in height of the vehicle.

The autoleveling unit 9 constructed as above described operates in the following manner to effect the autoleveling performance by connecting the oil supply port 49 to the piping 10, the oil exhaust port 50 to the drain pipe 11 and the cylinder port 26 to the piping 12, respectively.

FIGS. 2 and 3 illustrate the autoleveling unit 9 in a condition keeping a standard vehicle height. When the vehicle height is lowered from the standard height owing to an increase of the number of passengers, for example, the variation in height is transmitted from the antiroll bar 4 through the lever 54, connecting rod 55, vertical rod 56 and connecting block 57 to the cam shaft 34 to rotate the cam 33 in a clockwise direction as viewed in FIG. 3. As the cam rotates, the first piston 20 moves downwardly from the position shown in FIGS. 2 and 3 keeping in contact with the cam surface 33a through the ball 37. During the downward movement of the first piston, the balanced spring forces of the first and second springs 31 and 32 become unbalanced, so that the second piston 21 also lowers from the position shown in FIGS. 2 and 3 to a new position where the springs 31 and 32 are again balanced. When the lowering movement of the second piston 21 exceeds a determined distance, the stem 51 of the oil supply valve 45 is depressed to open the valve 45. At this moment, the oil pressure in the accumulator 8 is therefore fed through the piping 10, oil supply port 49 and oil supply valve 45 to the first oil chamber 22 and thereafter this oil pressure is fed through the cylinder port 26 to the suspension units 3, so that the suspension units 3 extend to return the vehicle height to the standard value. During this restoration of the vehicle height, the cam 33 returns to the original position in a reverse direction of the rotation, and the first and second pistons 20 and 21 return to the positions shown in FIGS. 2 and 3 when the vehicle height has returned to the standard value. After the returning of the vehicle height to the standard value, the second piston 21 is above and clear of the valve stem 51 of the oil supply valve 45 which is therefore closed so that no oil pressure is any longer supplied to the suspension units 3 and therefore the vehicle is kept at the standard height.

On the other hand, when the vehicle height becomes higher than the standard value, the cam 33 rotates from the positions shown in FIGS. 2 and 3 in a counterclockwise direction as viewed in FIG. 3. As the result, the first piston 20 is raised from the position shown in FIGS. 2 and 3 as it follows the cam profile 33c. At this time, the initially balanced forces of the springs 31 and 32 become unbalanced, so that the second piston 21 moves from the position shown in FIGS. 2 and 3 to a position where the springs 31 and 32 are again balanced. In this manner, during the raising movement of the second piston 21 from the normal position, the valve stem 52 of the oil exhaust valve 47 is raised by the ring 53 to open the valve 47, so that the oil pressure in the suspension units 3 is partially drawn through the piping 12, cylinder port 26, first oil chamber 22, oil exhaust valve 47, oil exhaust port 50 and drain pipe 11, with the result that the suspension units 3 retract to lower the vehicle height. During the lowering of the vehicle height, the cam 33 returns to the original position in the reverse direction. When the vehicle height returns to the standard value, the pistons 20 and 21 return to the positions shown in FIGS. 2 and 3. After the returning of the vehicle height to the standard value, the second piston 21 therefore disengages from the ring 53 provided on the valve stem 52 of the oil exhaust valve 47 to close it, so that no oil pressure is any longer exhausted from the suspension units 3 and therefore the vehicle is kept at the standard height.

In this manner, the vehicle height is normally kept at the standard value by the autoleveling function according to the invention even if loads acting upon the vehicle body vary. However, the second piston 21 does not move to the aforementioned extent performing the autoleveling function when the wheels of the moving vehicle momentarily hop due to unevenness of roads. In the neutral position shown in FIGS. 2 and 3, the oil chambers 22 and 23 on both sides of the second piston 21 are communicated only through the orifice 40a of the plug 40, so that a flow resistance of the operative oil flowing through the orifice of the plug provides a time delay constant to the movement of the second piston 21. The time delay constant is determined by a ratio of the diameter of the orifice 40a of the plug to the diameter of the second piston 21. Even if the first piston 20 is violently vertically moved from the neutral position above described when the wheels of the moving vehicle hop, the second piston 21 does not instantaneously move in response to the movements of the first piston 20 because of the time delay constant, thereby preventing a consumption of the oil pressure due to a superfluous autoleveling function.

In the autoleveling function, moreover, the oil chambers 22 and 23 are communicated with each other through the oil passages 43, groove 42 and channel 42a with the openings of the oil passages 43 alternately communicating with the groove 42, so that the operative oil is smoothly transferred between the oil chambers 22 and 23 and therefore the second piston 21 is not governed in its movement. In other words, except for momentary rapid reciprocal movements of the first piston 20, the orifice 40a of the plug 40 does not serve to provide the time delay constant to the second piston 21 in the autoleveling function, so that the function is rapidly effected without any time delay.

With autoleveling device according to the invention as above described, the variations in vehicle height are converted into the rotations of the cam 33 to adjust the vehicle height, whereby the displacements of the second piston 21 performing the adjustment of the vehicle height in response to the variations in vehicle height are freely selected by suitably determining the profile of the cam 33. With the cam profile of the cam 33 shown in FIG. 3, the displacements of the first piston 20 in response to the variations in vehicle height in the proximity of the set vehicle height are large as can be seen from the cam surfaces 33b and 33c, and the displacements of the first piston 20 are zero as can be seen from the cam surfaces 33d and 33e after the commencement of the autoleveling operation where either of the oil supply and exhaust valves 45 and 47 is opened by the movement of the second piston 21, thereby simultaneously fulfilling contradictory requirements in that the sensitivity of the autoleveling operation becomes higher and the autoleveling unit 9 is made as small as possible by rendering smaller the operative movements of the pistons 20 and 21. In this case, moreover, the durability of the autoleveling unit can be remarkably increased because of the springs 31 and 32 which are not subjected to repeated excessive compressions by eliminating unnecessary displacements of the pistons 20 and 21 in conjunction with the decrease of the wear of the pistons resulting therefrom.

Furthermore, when the diameter of the second piston 21 is made large as shown in the drawings, the damping effect on the second piston 21 created by the orifice 40a of the plug 40 is magnified. Therefore, the diameter of the orifice 40a can be made quite large in order to increase the accuracy of the damping effect while still obtaining sufficient damping effect.

It is further understood by those skilled in the art that the foregoing description is of preferred embodiments of the disclosed devices and that various changes and modifications may be made in the invention without departing from the spirit and scope thereof.

What is claimed is:

1. In a vehicle having a body, wheels, a suspension system affixed to the body and movably supporting the wheels, a hydraulic pressure source, and a hydro-pneumatic suspension unit forming a part of the suspension system for each wheel, an improved autoleveling device for operating the hydro-pneumatic suspension units, the improved autoleveling device comprising: a housing fixed to the vehicle body, said housing including an oil supply port, an oil exhaust port and a cylinder port commonly connected to each said hydro-pneumatic suspension unit, a cam in said housing rotating in response to variations in vehicle body to vehicle wheel relative positions, a first piston in said housing moving in response to the profile of said rotating cam, a second piston in said housing oriented in opposition to said first piston, a first spring interposed between said first and second pistons, a second spring seated on the other side of said second piston to support and balance said second piston in cooperation with said first spring, an oil supply valve in said housing opened by the displacement of said second piston in excess of a selected distance in one direction to communicate said cylinder port with said oil supply port, and an oil exhaust valve in said housing opened by the displacement of said second piston in excess of a selected distance in the other direction to communicate said cylinder port with said oil exhaust port, a first oil chamber in said housing on one side of said second piston enclosing said first spring, and a second oil chamber in said housing on the other side of said second piston enclosing said second spring, said two oil chambers in communication with each other through an orifice.

2. An autoleveling device as set forth in claim 1, wherein said oil supply valve is opened when said second piston moves toward said first piston and said oil exhaust valve is opened when said second piston moves away from said first piston.

3. An autoleveling device as set forth in claim 1, wherein said first piston is formed with through-apertures and said housing is formed with oil apertures to normally equalize pressures on both sides of the first piston.

4. An autoleveling device as set forth in claim 1, wherein said housing is formed with an inner surface on which said second piston slidably moves with a groove communicating with said second oil chamber, and said second piston is formed with oil passages opening at two points in a circumferential surface of said second piston spaced apart determined distances from said groove on both sides thereof when said second piston is balancingly supported corresponding to a standard vehicle height and communicating with said first oil chamber.

5. An autoleveling device as set forth in claim 1, wherein said cam profile is so shaped that said first piston is greatly displaced by cam rotation in response to selected ranges of variations in vehicle body to wheel relative positions, and said first piston is substantially less displaced in response to other selected ranges of variations in vehicle body to wheel relative positions.

6. An autoleveling device as set forth in claim 1, wherein said oil supply valve and said oil exhaust valve are positioned adjacent to said first piston, and said second piston has a diameter at least as large as the combined diameters of said two valves and said first piston.

* * * * *